(12) United States Patent
Bell

(10) Patent No.: US 6,578,648 B2
(45) Date of Patent: Jun. 17, 2003

(54) DRIVE AXLE CONTROL SYSTEM

(75) Inventor: Dale K. Bell, Ortonville, MI (US)

(73) Assignee: Meritor Heavy Vehicle Technology, LLC, Troy, MI (US)

( * ) Notice: Subject to any disclaimer, the term of this patent is extended or adjusted under 35 U.S.C. 154(b) by 0 days.

(21) Appl. No.: 10/282,840

(22) Filed: Oct. 29, 2002

(65) Prior Publication Data

US 2003/0051933 A1 Mar. 20, 2003

Related U.S. Application Data

(62) Division of application No. 09/872,666, filed on Jun. 1, 2001, now Pat. No. 6,499,552.

(51) Int. Cl.$^7$ ............................................. B60C 23/00
(52) U.S. Cl. ...................... 180/24.11; 180/197; 701/92; 340/442; 340/444; 280/757; 280/124.115; 280/5.514
(58) Field of Search ............................ 180/24.09, 197, 180/24.1, 24.11; 280/5.514, 124.115, 757; 340/442, 444; 152/418, 416; 303/191, 113.2; 701/92

(56) References Cited

U.S. PATENT DOCUMENTS

| | | | | |
|---|---|---|---|---|
| 5,249,609 A | * | 10/1993 | Walker et al. ................. | 141/1 |
| 5,273,064 A | * | 12/1993 | Beverly et al. ............. | 137/102 |
| 5,327,346 A | * | 7/1994 | Goodell ...................... | 152/416 |
| 5,629,874 A | * | 5/1997 | Mittal ........................ | 152/415 |
| 5,721,374 A | * | 2/1998 | Siekkinen et al. .......... | 340/442 |
| 5,749,984 A | * | 5/1998 | Frey et al. ............... | 152/152.1 |
| 5,839,801 A | * | 11/1998 | Ferguson ..................... | 141/38 |
| 5,877,455 A | | 3/1999 | Kyrtsos | |
| 5,927,422 A | | 7/1999 | Schakel | |
| 5,940,781 A | * | 8/1999 | Nakajima .................... | 340/442 |
| 6,118,369 A | * | 9/2000 | Boesch ........................ | 340/442 |
| 6,144,295 A | * | 11/2000 | Adams et al. .............. | 137/224 |
| 6,203,045 B1 | | 3/2001 | Kyrtsos | |
| 6,212,464 B1 | * | 4/2001 | Skotnikov .................... | 701/71 |
| 6,218,935 B1 | * | 4/2001 | Corcoran et al. ........... | 340/441 |
| 6,336,481 B1 | * | 1/2002 | Tigges ......................... | 141/38 |

FOREIGN PATENT DOCUMENTS

| | | | | |
|---|---|---|---|---|
| EP | 0 788 901 A1 | * | 8/1997 | |
| GB | 2 246 461 A | * | 1/1992 | |
| GB | 2 198 552 A | * | 6/1998 | |

OTHER PUBLICATIONS

Application Ser. No. 09/207,796.

* cited by examiner

*Primary Examiner*—Paul N. Dickson
*Assistant Examiner*—Ruth Ilan
(74) *Attorney, Agent, or Firm*—Carlson, Gaskey & Olds

(57) ABSTRACT

Tandem drive axles include a pair of drive axles interconnected by a thru-shaft. An inter-axle differential allows speed differentiation between the pair of axles. Differences in tire rolling radii and variations in axle load distribution between the pair of drive axles are examples of why axle differentiation is needed. By measuring and monitoring wheel speed and/or tire pressure, tire rolling radii differences can be determined and appropriate adjustments can be made to tire pressures to provide a common tire rolling radii range for all tires. In addition to tire pressure adjustment, by adjusting other axle parameters that affect axle performance, such as suspension height and weight distribution, the need for axle differentiation is eliminated.

21 Claims, 3 Drawing Sheets

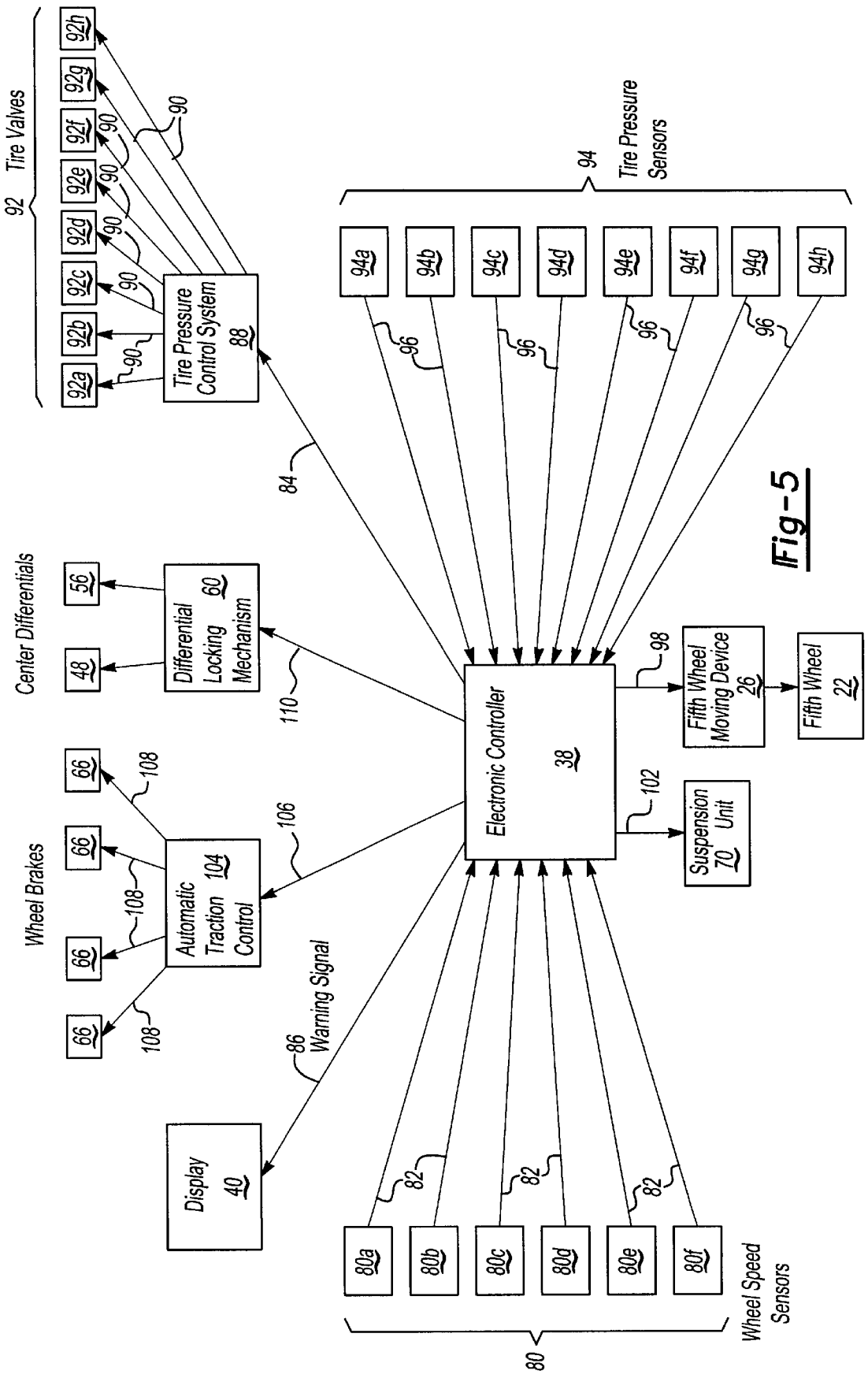

DRIVE AXLE CONTROL SYSTEM

This application is a divisional of 09/872,666 filed on Jun. 1, 2001 now U.S. Pat. No. 6,499,552.

BACKGROUND OF THE INVENTION

This invention relates to a method and apparatus for adjusting axle parameters that affect axle speeds for a tandem drive axle so that an inter-axle differential is not required.

Tandem drive axles are typically used in heavy-duty truck applications. One example of a heavy-duty truck is a semi-tractor and trailer vehicle. The drivetrain for a semi-tractor typically includes a front non-drive steer axle and a tandem drive axle. A fifth wheel, positioned over the tandem drive axle, is used to connect the trailer to the tractor.

The tandem drive axle includes a front drive axle connected to a rear drive axle via a thru-shaft. An engine provides driving input to a center differential of the front drive axle via an input shaft. The thru-shaft couples the center differential of the front axle to a center differential of the rear drive axle to transfer driving torque from the front drive axle to the rear drive axle.

Under certain conditions, the front and rear drive axles may require speed differentiation. For example, speed differentiation is required in situations where axle loads are not distributed evenly between the front and rear drive axles or if tires on the axles have different rolling radii. To achieve speed differentiation, the front axle typically includes an inter-axle differential housed within the center differential. The inter-axle differential allows for speed differentiation between the front and rear drive axles. Incorporating an inter-axle differential into the tandem drive axle is expensive and adds additional weight to the vehicle.

Some specialty off-highway applications use tandem axles that do not include inter-axle differentials, allowing wheel slip to equalize axle speeds on paved surfaces. This increases tire wear, reduces axle component life, and reduces fuel economy, which is undesirable.

Thus, it is desirable to provide a tandem drive axle that does not require an inter-axle differential that overcomes the deficiencies discussed above.

SUMMARY OF THE INVENTION

A control system for a heavy duty vehicle is used to maintain pre-selected axle parameters at desired conditions so that axle differentiation for a tandem drive axle is not needed. A tandem drive axle includes a front drive axle connected to a rear drive axle with a thru-shaft. Axle parameters such as differences in tire rolling radii, unequal weight distribution between the front and rear drive axles, and a suspension set at an improper height (affecting oscillation inputs from drivelines) can affect axle speeds, thus necessitating axle differentiation.

The subject invention utilizes a control system that determines differences in tire rolling radii by monitoring wheel speed and/or tire pressure and adjusts tire pressure for the tires mounted to the front and rear axles to maintain each of the tires within a desirable tire rolling radii range or notifies an operator when such adjustment is unachievable and tire maintenance is required. The control system also generates control signals for adjusting weight distribution between the axles and for adjusting suspension height to maintain desired levels.

The axles include center differentials that distribute driving torque from an engine to driving wheels that support the tires. Brakes are mounted within the wheels to provide braking for the vehicle. An automatic traction control system controls axle speed via wheel braking or a center differential locking control is used to control axle speeds via the center differentials to maintain vehicle tractive effort capability.

The subject method and apparatus eliminate the need for an inter-axle differential mechanism resulting in improved fuel economy, weight reduction, and cost reduction. These and other features of the present invention can be best understood from the following specification and drawings, the following of which is a brief description.

BRIEF DESCRIPTION OF THE DRAWINGS

FIG. 5 schematically illustrates a control system designed according to this invention.

DETAILED DESCRIPTION OF A PREFERRED EMBODIMENT

Figure 1:
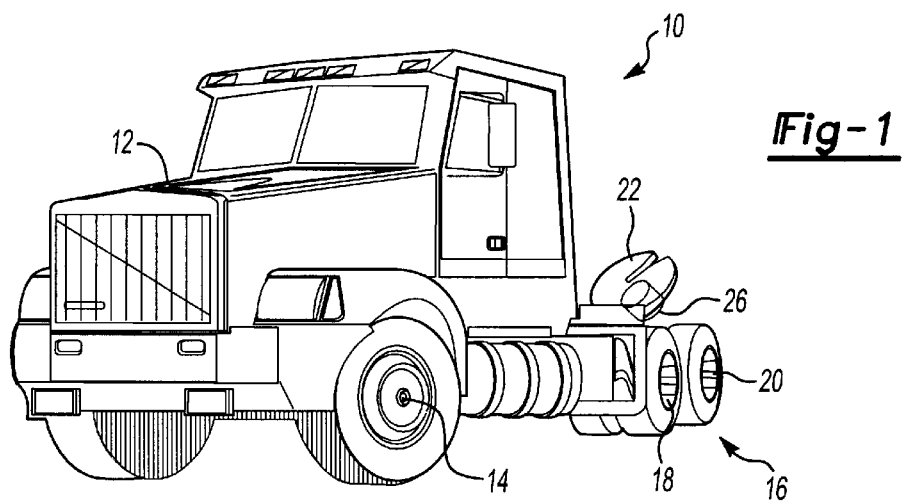
FIG. 1 diagrammatically illustrates selected portions of a heavy duty vehicle that includes a system designed according to this invention.

A heavy duty vehicle 10, such as a tractor-trailer vehicle is shown in FIG. 1. A typical drivetrain for a tractor 12 includes a front axle 14 and a rear tandem drive axle 16. Typically, the front axle 14 is a non-drive steer axle, however, driving steer axles can also be used. The rear tandem drive axle 16 includes a rear-front drive axle 18 and a rear-rear drive axle 20. An adjustable wheel 22, which is commonly referred to as a "fifth wheel," facilitates connecting a trailer portion 24 to the tractor 12. A moving device is schematically illustrated at 26 that provides for automated movement of the adjustable wheel 22 into a plurality of positions relative to the tractor 12.

Figure 2:
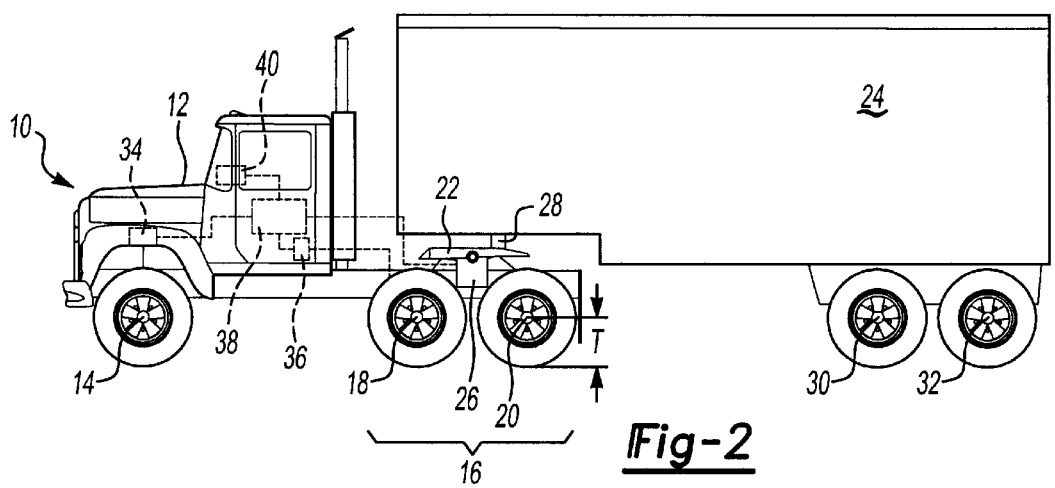
FIG. 2 diagrammatically illustrates a heavy duty vehicle including a control system designed according to this invention.

FIG. 2 diagrammatically illustrates the vehicle including the trailer portion 24 connected to the tractor 12. A conventional connector 28 facilitates connecting the trailer portion 24 to the tractor 12 by the interaction between the connector 28 and the adjustable wheel 22.

The trailer portion 24 typically includes a plurality of non-driven trailer axles 30, 32. Accordingly, the heavy duty vehicle includes a plurality of wheel axles, some of which are associated with the tractor 12 and are driven by a vehicle engine 34 and some of which are associated with the trailer portion 24.

A plurality of sensors, indicated generally at 36 are associated with each of the wheel axles 14, 18, 20 and various other vehicle components for detecting different types of information at each of the wheel axles and at other vehicle components such as the suspension and adjustable wheel 22. The information from the sensors 36 is communicated to an electronic controller 38. A conventional microprocessor or other similar electronic control unit can be used for the electronic controller 38. Given this description, those skilled in the art will be able to choose from commercially available microprocessors or to custom design electronics and software to accomplish the results provided by this invention.

The electronic controller 38 receives and collects information from the sensors 36 to determine various axle and vehicle component conditions. The controller 38 compares this information to desired conditions and generates various control signals to adjust axle parameters to bring measured conditions closer to the desired or "ideal" conditions. This will be discussed in greater detail below. Any of these various axle or vehicle component conditions can be displayed to an operator on a display 40. The display 40 can be any known display device and can include warning lights, audible warning indicators, as well as graphical and text display.

Figure 3:
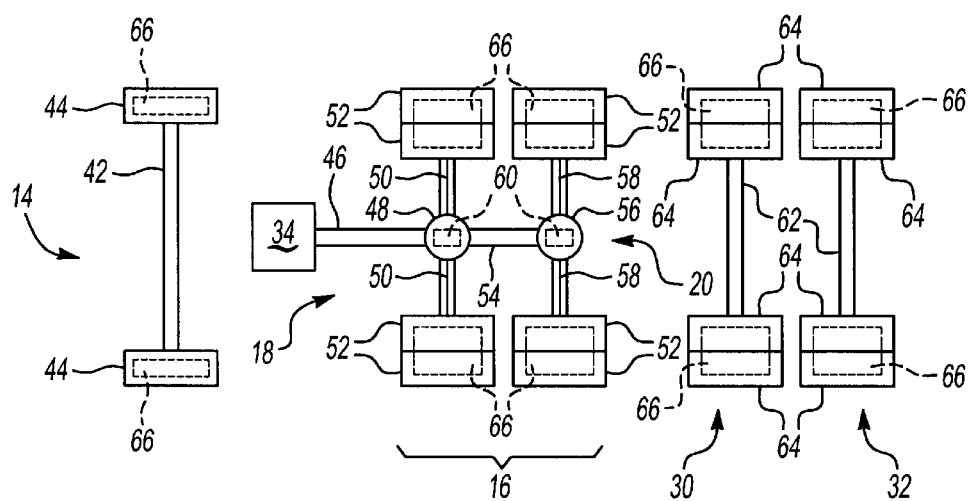
FIG. 3 schematically illustrates an overhead view of a heavy duty drivetrain including a control system designed according to this invention.

As shown in FIG. 3, the front non-drive steer axle 14 typically includes a center beam 42 extending to wheels that support front tires 44. The engine 34 provides driving torque to the tandem axle 16 via a driveshaft 46. The front drive axle 18 includes a center differential 48 that is coupled to the driveshaft 46 and which drives a pair of axle shafts 50 that extend to wheels that support tires 52. A thru-shaft 54 interconnects the front center differential 48 to a rear axle center differential 56 that drives a pair of axle shafts 58 that extend to wheels that support tires 52. The center differentials 48, 56 can include locking mechanisms 60, well known in the art, that can lock the first pair of axle shafts 50 together and the second pair of axle shafts 58 together under certain predetermined conditions. This will be discussed in further detail below.

The trailer axles 30, 32 typically include a tubular member 62 that extends to tires 64. While only two (2) trailer axles are shown, it should be understood that additional trailer axles could be used.

Each of the wheels on the tractor 12 preferably includes a wheel brake mechanism 66 that can be actuated for vehicle braking. Any type of brake mechanism known in the art can be used including drum, dry-disc, or wet disc type brakes. Typically, trailer axles 30, 32 also include wheel brake mechanisms 66.

Figure 4A:
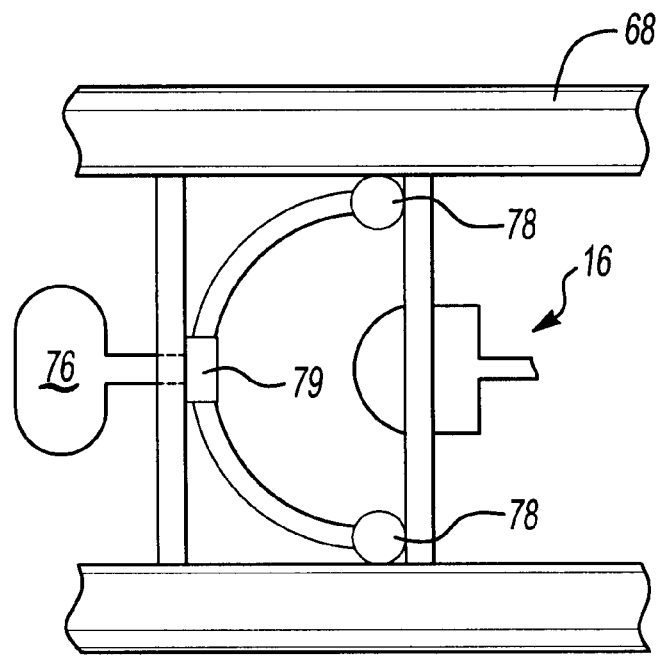
FIG. 4A schematically illustrates a top view of a suspension unit including a control system designed according to this invention.
Figure 4B:
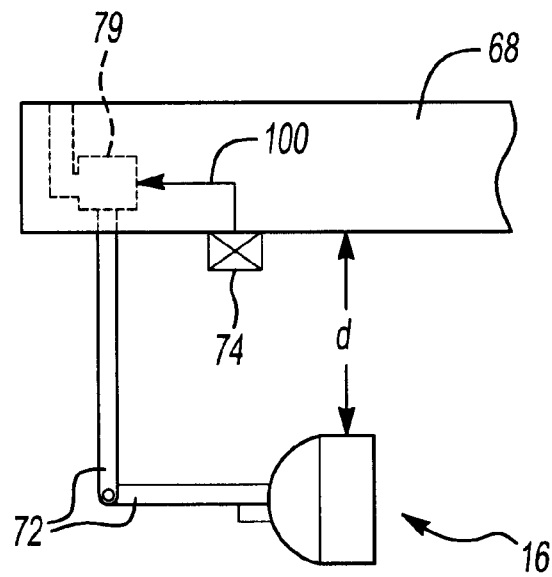
FIG. 4B schematically illustrates a side view of the suspension unit including a control system designed according to this invention.

As shown in FIG. 4, the tandem axle, indicated schematically at 16, is mounted to a vehicle frame member 68 with a suspension unit 70. The suspension unit 70 is preferably an air suspension of a trailing arm type having an adjustable mechanical linkage assembly 72 that is set to a desired height "d" between the axle 16 and the frame member 68. This desired height is determined based on various parameters set by original equipment manufacturers (OEMs). Typically, the mechanical linkage assembly 72 controls height "d". The height "d" is determined by the position of the frame member 68 relative to the axle 16. A supply or evacuation of air 76 to air bags 78 is mechanically actuated to bring the relative position of frame 68 and axle 16 back into the intended relationship. Because the distance "d" can be manually adjusted, destroying ideal forward to rear axle relationship throughout suspension positions, it is preferred that linkage assembly 72 be used at vehicle build to set a device 74, such as a linear potentiometer to record the desired distance "d". Upon variation from distance "d", the linear potentiometer 74 will send a signal 100 to actuate a valve 79 to supply or evacuate air from the air bags 78 to restore the distance "d" to the original intended relationship The control system incorporating the subject invention is shown in FIG. 5. The sensors 36 discussed generally above are discussed in detail with regard to the control system of FIG. 5. Each of the wheels on the tractor 12 includes a wheel speed sensor 80 that measures the respective wheel speed. The front non-drive axle 14 includes wheel speed sensors 80a, 80b. The front drive axle 18 includes wheel speed sensors 80c, 80d and the rear drive axle 20 includes wheel speed sensors 80e, 80f. Each of these sensors 80 measures wheel speed and generates a respective wheel speed signal 82 that is transmitted to the controller 38. The wheel speed sensors 80 can be any type of speed sensor known in the art but are preferably wheel speed sensors used in anti-lock braking systems (ABS).

The controller 38 determines a respective tire rolling radius Tr (see FIG. 2) for each of the tires 52 based on the wheel speed signals 82. By using an algorithm in the ABS to count and compare wheel revolutions vs. time, the differences between tire rolling radii for each of the tires is determined. Ideally, the tire rolling radii should be approximately equal such that differentiation between the front 18 and rear 20 drive axles is not required. If differences are detected, then the controller generates a control signal 84 to adjust tire pressure in the designated tires to bring all tires within a common tire rolling radii range. If the differences in tire rolling radii exceed a predetermined limit, the tires are too worn and the controller 38 generates a warning signal 86 that is sent to the display 40.

To adjust tire pressure, a tire pressure control system 88 generates pressure control signals 90 to tire valves 92 at each of the tires 52 that require adjustment to be brought within the common range. Typically, dual tires are mounted on each of the tire wheels, so tire valves 92a–h are indicated, however, it should be understood that the system operates in a similar manner when only one tire is mounted at each wheel end.

Preferably, tire pressure is adjusted until all of the tires 52 have the same tire rolling radius. The tire pressure control system 88 operates in a similar manner as a central tire inflation system (CTIS), which is well known in the art and the control system 88 is preferably integrated within an existing CTIS on the vehicle.

In one embodiment, the control system includes tire pressure sensors 94 at each of the tires 52. The tire pressure sensors 94a–h measure/monitor tire pressure and generate tire pressure signals 96 that are transmitted to the controller 38. The controller 38 can use this data along with the wheel speed signals 82 to monitor differences in tire rolling radii.

By controlling tire pressure to equalize tire rolling radii on the tandem axle 16, the need for axle differentiation between the front and rear drive axles is eliminated. In addition to equalizing tire rolling radii, adjusting weight distribution on the front and rear drive axle also eliminates the need for axle differentiation. To determine the individual axle loads supported by the front 18 and rear 20 axles various methods can be used. One such method is disclosed in U.S. Pat. No. 5,877,455 assigned to the assignee of the subject invention and herein incorporated by reference. Improvements to this method are disclosed in pending application Ser. No. 09/207,796 titled "Weight Distribution Monitor" assigned to the assignee of the subject invention and herein incorporated by reference.

Once the axle loads are determined, the fifth wheel 22 can be adjusted via the moving device 26 either manually or through a pneumatic system to balance load distribution between the front 18 and rear 20 axles. One such method for adjusting the fifth wheel 22 is disclosed in U.S. Pat. No. 6,203,045 assigned to the assignee of the subject invention and herein incorporated by reference. When adjustment is required, the controller 38 generates a weight adjustment signal 98 that controls the moving device 26. Preferably, the moving device 26 adjusts the position of the fifth wheel 22 until the load is equally balanced on the front 18 and rear 20 axles.

Another axle parameter that can optionally be controlled to maintain desired axle performance is suspension height. As discussed above, the suspension height sensor 74 measures the height "d" between the axle 16 and the frame member 68 and generates a height signal 100 that is transmitted to the controller 38. If adjustment is required the controller generates a suspension adjustment signal 102 that adjusts the suspension unit 70 until the desired height is achieved.

Additionally, the axle differentials 48, 56 can be controlled to eliminate the need for an inter-axle differential. One such differential control mechanism can utilize an automatic traction control (ATC) system 104, which is well known in the art. The controller 38 generates and compares front and rear axle speed signals, which are derived from wheel speed measurements, to determine an axle speed difference. The ATC system 104 maintains the front and rear axle speeds within a predetermined axle speed range by controlling wheel speed via the wheel brakes 66. Wabco manufactures one such ATC system 104. The controller 38 generates a signal 106 to activate the ATC system 104, which in turn generates individual brake control signals 108 to adjust wheel speed as needed.

Another differential control method is disclosed in U.S. Pat. No. 5,927,422 assigned to the assignee of the subject invention and herein incorporated by reference. In this system, a control signal 110 is generated to actuate locking mechanisms 60 in the center differentials 48, 56 as needed.

The subject control system eliminates the need for an inter-axle differential mechanism resulting in improved fuel economy, weight reduction, and cost reduction. Differences in tire rolling radii on a tandem axle and variations in the load distribution between the front and rear axles of the tandem are reasons why axle differentiation has been needed. By counting and comparing wheel revolutions to determine tire rolling radii differences, a tire pressure maintenance/monitoring system can vary tire pressure to commonize the tire rolling radii. Or, if differences in tire rolling radii are too great, the system can warn the operator to check the tires. To further optimize axle performance, air leveling valves of an air suspension system can be adjusted by a controller to maintain a desired operating height. By maintaining the desired height, damaging vibrations are eliminated. Further optimization of axle parameters include monitoring weight distribution on the front and rear axles, adjusting the weight distribution, and controlling differentials with an ATC system or with locking mechanisms.

Although a preferred embodiment of this invention has been disclosed, it should be understood that a worker of ordinary skill in the art would recognize many modifications come within the scope of this invention. For that reason, the following claims should be studied to determine the true scope and content of this invention.

What is claimed is:

1. A method for maintaining a front axle speed and a rear axle speed from a tandem axle set within a predetermined speed range comprising the steps of:

(a) determining a tire rolling radius for each driven axle wheel on a tandem axle;

(b) comparing tire rolling radii measurements to each other to determine tire rolling radii differences; and (c) adjusting tire pressure to maintain all tire rolling radii within a predetermined range relative to each other.

2. The method of claim 1 wherein step (c) includes adjusting tire pressure such that all tire rolling radii are equal.

3. The method of claim 1 including the step of maintaining a desired weight distribution on front and rear drive axles of the tandem axle set.

4. The method of claim 3 including the step of adjusting a movable mounting wheel that connects a trailer to a tractor to maintain equal weight distribution on the front and rear drive axles.

5. The method of claim 1 including the step of adjusting suspension height between the tandem axle set and a vehicle frame member to maintain a desired suspension height.

6. The method of claim 1 including the step of maintaining front and rear axle speeds within the predetermined speed range by actuating braking control at the driven axle wheels.

7. The method of claim 1 including the step of generating a warning signal if differences between tire rolling radii exceed a predetermined limit.

8. A method for controlling axle speed for a tandem drive axle having a front axle coupled to a rear axle comprising the steps of:

(a) measuring at least one wheel characteristic at each wheel of the front and rear axles and generating a plurality of wheel signals;

(b) comparing the wheel signals to each other to determine differences in tire rolling radii; and (c) automatically adjusting at least one vehicle characteristic in response to step (b) to control speed differentiation between the front and rear axles without using an inter-axle differential.

9. The method of claim 8 wherein the vehicle characteristic comprises tire pressure with tire pressure adjustment being solely responsible for speed differentiation between the front and rear axles.

10. The method of claim 8 wherein the at least one wheel characteristic comprises wheel speed and wherein step (a) includes measuring the wheel speed at each wheel of the front and rear axles.

11. The method of claim 8 wherein the vehicle characteristic comprises tire pressure and step (c) includes adjusting tire pressure on the wheels such that each tire rolling radius is maintained within a predetermined percentage range with respect to all of the tires.

12. The method of claim 8 wherein the vehicle characteristic comprises tire pressure and step (c) includes independently and selectively adjusting tire pressure in each of the wheels to control speed differentiation between the front and rear axles.

13. The method of claim 8 further including the step of determining a weight ratio between the front axle and the rear axle and generating a weight control signal to redistribute weight between the front and rear axles when the weight ratio exceeds a predetermined limit.

14. The method of claim 13 including the steps of providing an adjustable wheel for connecting a trailer to a tractor and adjusting the position of the adjustable wheel to redistribute axle load between the front and rear axles in response to receiving the weight control signal.

15. The method of claim 8 including the step of measuring an actual suspension height between the tandem drive axle and a vehicle frame member and adjusting suspension height when the actual suspension height various from a predetermined suspension height.

16. The method of claim 15 including the steps of providing an air suspension assembly including at least one air bag member positioned between the tandem drive axle and the vehicle frame member, generating a suspension height control signal in response to measuring the actual suspension height and communicating the suspension height control signal to a valve in communication with the air bag member to adjust suspension height if the actual suspension height is different than a desired suspension height.

17. The method of claim 8 wherein the vehicle characteristic comprises tire pressure and including the steps of generating a first tire signal if the differences in tire rolling radii are within a predetermined range, generating a second tire signal if the differences in tire rolling radii exceed the predetermined range, and activating a warning indicator in response to receiving the second tire signal.

18. The method of claim 8 wherein the at least one wheel characteristic comprises tire pressure and wherein step (a) includes measuring tire pressure at each wheel of the front and rear axles, generating tire pressure signals, and step (b) includes comparing the tire pressure signals to each other to determine differences in tire rolling radii.

19. The method of claim 18 including the steps of generating a front axle speed signal based on wheel speed measurements of front axle driven wheels, generating a rear axle speed signal based on wheel speed measurements of rear axle driven wheels, and comparing front and rear axle speed signals to each other to determine an axle speed difference.

20. The method of claim 19 including the step of maintaining front and rear axle speeds within a predetermined axle speed range by brake control via an automatic traction control apparatus.

21. The method of claim 19 including the step of maintaining front and rear axle speeds within a predetermined axle speed range by controlling at least one locking apparatus in at least one of the front or rear axles.

* * * * *

UNITED STATES PATENT AND TRADEMARK OFFICE
CERTIFICATE OF CORRECTION

PATENT NO.   : 6,578,648 B2
DATED        : June 17, 2003
INVENTOR(S)  : Dale K. Bell It is certified that error appears in the above-identified patent and that said Letters Patent is hereby corrected as shown below:

<u>Column 6,</u>
Line 66, "various" should be -- varies --.

Signed and Sealed this

Twelfth Day of August, 2003

JAMES E. ROGAN
*Director of the United States Patent and Trademark Office*